(12) United States Patent
Elizarov et al.

(10) Patent No.: US 7,862,000 B2
(45) Date of Patent: Jan. 4, 2011

(54) MICROFLUIDIC METHOD AND STRUCTURE WITH AN ELASTOMERIC GAS-PERMEABLE GASKET

(75) Inventors: Arkadij Elizarov, Valley Village, CA (US); James R. Heath, South Pasadena, CA (US); Hartmuth Kolb, Playa del Rey, CA (US); Michael van Dam, Glendale, CA (US)

(73) Assignees: California Institute of Technology, Pasadena, CA (US); Siemens Medical Solutions, Malvern, PA (US)

( * ) Notice: Subject to any disclaimer, the term of this patent is extended or adjusted under 35 U.S.C. 154(b) by 853 days.

(21) Appl. No.: 11/701,917

(22) Filed: Feb. 2, 2007

(65) Prior Publication Data
US 2007/0200081 A1    Aug. 30, 2007

Related U.S. Application Data

(63) Continuation-in-part of application No. 11/514,396, filed on Aug. 30, 2006.

(60) Provisional application No. 60/765,150, filed on Feb. 3, 2006, provisional application No. 60/791,778, filed on Apr. 13, 2006.

(51) Int. Cl.
*F16K 1/00*    (2006.01)
(52) U.S. Cl. .................... 251/7; 251/331; 251/335.2
(58) Field of Classification Search ............ 251/7, 251/8, 331, 335.2
See application file for complete search history.

(56) References Cited

U.S. PATENT DOCUMENTS

| | | | | |
|---|---|---|---|---|
| 2,716,017 A | * | 8/1955 | Linker | 251/331 |
| 2,971,851 A | * | 2/1961 | Kurtz | 426/61 |
| 3,378,406 A | * | 4/1968 | Rosansky | 429/28 |
| 3,407,249 A | * | 10/1968 | Landi | 264/49 |
| 3,507,708 A | * | 4/1970 | Vignaud | 429/86 |
| 3,613,729 A | * | 10/1971 | Dora | 251/331 |
| 3,663,409 A | * | 5/1972 | Greene | 204/408 |
| 4,062,750 A | * | 12/1977 | Butler | 257/253 |
| 4,326,518 A | * | 4/1982 | Williams | 251/7 |
| 4,500,905 A | * | 2/1985 | Shibata | 257/74 |
| 4,696,195 A | * | 9/1987 | Savonlahti et al. | 73/864.84 |
| 4,721,133 A | * | 1/1988 | Sundblom | 251/61.1 |
| 4,924,241 A | * | 5/1990 | Parks et al. | 251/331 |
| 4,977,948 A | | 12/1990 | Chandley | |
| 5,624,556 A | | 4/1997 | Kutowy | |

(Continued)

FOREIGN PATENT DOCUMENTS

WO    00/73412 A2    12/2000

(Continued)

OTHER PUBLICATIONS

PCT Search Report for PCT/US2007/003208 in the name of Elizarov, Arkadij et al. filed on Jul. 23, 2007.

(Continued)

*Primary Examiner*—John Bastianelli
(74) *Attorney, Agent, or Firm*—Steinfl & Bruno LLP

(57) ABSTRACT

A microfluidic structure and method, where the structure comprises a featureless gasket layer allowing for efficient and reproducible structure production and assembly. Layering methods allow for the use of a variety of device materials and easy assembly.

32 Claims, 17 Drawing Sheets

U.S. PATENT DOCUMENTS

| | | | |
|---|---|---|---|
| 5,765,591 A * | 6/1998 | Wasson et al. | 137/597 |
| 5,863,502 A | 1/1999 | Southgate | |
| 5,989,402 A | 11/1999 | Chow et al. | 204/601 |
| 6,065,195 A * | 5/2000 | Chatterjee et al. | 29/890.1 |
| 6,145,810 A * | 11/2000 | Connolly et al. | 251/331 |
| 6,158,712 A * | 12/2000 | Craig | 251/61.1 |
| 6,399,025 B1 | 6/2002 | Chow | 422/102 |
| 6,752,371 B2 * | 6/2004 | Herbert et al. | 251/331 |
| 6,814,337 B2 * | 11/2004 | Schmaltz | 251/7 |
| 6,830,729 B1 | 12/2004 | Holl | |
| 7,040,338 B2 | 5/2006 | Unger | |
| 7,223,363 B2 | 5/2007 | McNeely et al. | 422/58 |
| 2001/0012612 A1 | 8/2001 | Peterson | |
| 2002/0127146 A1 | 9/2002 | Bergh et al. | 422/89 |
| 2002/1666585 | 11/2002 | O'Connor et al. | 137/87.01 |
| 2003/0019833 A1 | 1/2003 | Unger et al. | 216/2 |
| 2003/0190608 A1 * | 10/2003 | Blackburn | 435/6 |
| 2003/0194716 A1 * | 10/2003 | Knoll | 435/6 |
| 2003/0214057 A1 | 11/2003 | Huang et al. | 264/1.1 |
| 2004/0037739 A1 | 2/2004 | McNeely et al. | 422/58 |
| 2004/0101444 A1 | 5/2004 | Sommers et al. | 422/100 |
| 2005/0214173 A1 | 9/2005 | Facer et al. | 422/100 |
| 2005/0266582 A1 * | 12/2005 | Modlin et al. | 436/164 |
| 2006/0078475 A1 | 4/2006 | Tai et al. | 422/102 |
| 2006/0163069 A1 | 7/2006 | Prak et al. | 204/601 |
| 2007/0012891 A1 | 1/2007 | Maltezos | |
| 2007/0051412 A1 | 3/2007 | Heath et al. | 137/561 R |
| 2007/0272309 A1 | 11/2007 | Rehm et al. | 137/528 |
| 2008/0131327 A1 | 6/2008 | Van Dam et al. | 422/103 |
| 2009/0008253 A1 | 1/2009 | Gilbert et al. | 422/68.1 |

FOREIGN PATENT DOCUMENTS

| | | |
|---|---|---|
| WO | 01/073417 | 10/2001 |
| WO | 02/070932 A2 | 9/2002 |
| WO | 02/072264 | 9/2002 |

OTHER PUBLICATIONS

PCT Written Report for PCT/US2007/003208 in the name of Elizarov, Arkadij et al. filed on Jul. 23, 2007.
Lai, S. M et al. Knoevenagel condensation reaction in a membrane microreactor *Chem. Commun*, 2003, 218-219.
Yamamoto, T. et al. PDMS-glass hybrid microreactor array with embedded temperature control device. Application to cell-free protein synthesis *Lab Chip*, 2002, 2, 197-202.
Psaltis, D. et al. Developing optofluidic technology through the fusion of microfluidics and optics *Nature*, 2006, 442, 381-386.
Grover,W. H. et al. Monolithic membrane valves and diaphragm pumps for practical large-scale integration into glass microfluidic devices *Sensors and Actuators E*, 2003,89,315-323.
Lee, C.-C. et al. Multistep Synthesis of a Radiolabeled Imaging Probe Using Integrated Microfluidics *Science*, 2005, 310, 1793-1797).
Gillies, J. M. et al. Microfluidic reactor for the radiosynthesis of PET radiotracers *J. Appl. Rad. Isot.* 2006, 64, 325-332.
Yuen, P. K et al. Semi-disposable microvalves for use with microfabricated devices or microchips *J. Micromech. Microeng.* 2000, 10, 401-409.
Extended European Search Report for EP 07763338.6 mailed on May 10, 2010.
PCT Search Report for PCT/US2006/034083 filed on Aug. 30, 2006 in the name of California Institute of Technology.
PCT Written Opinion for PCT/US2006/034083 filed on Aug. 30, 2006 in the name of California Institute of Technology.
PCT Search Report for PCT/US2007/079601 filed on Sep. 26, 2007 in the name of California Institute of Technology.
PCT Written Opinion for PCT/US2007/079601 filed on Sep. 26, 2007 in the name of California Institute of Technology.
Restriction Requirement issued by USPTO for U.S. Appl. No. 11/514,396 dated Sep. 23, 2009.
Office Action issued by USPTO for U.S. Appl. No. 11/514,396 dated Feb. 24, 2010.
Office Action issued by USPTO for U.S. Appl. No. 11/514,396 dated Aug. 12, 2010.
Restriction Requirement issued by USPTO for U.S. Appl. No. 11/862,127 dated Oct. 16, 2009.
Office Action issued by USPTO for U.S. Appl. No. 11/862,127 dated Dec. 21, 2009.
Office Action issued by USPTO for U.S. Appl. No. 11/862,127 dated May 12, 2010.
van Dam, R.M., "Solvent-Resistant Elastomeric Microfluidic Devices and Applications", PhD Thesis, California Institute of Technology (Aug. 2005).
Liu, J. et al. Solving the "World-to-Chip" Interface Problem with a Microfluidic Matrix. Anal. Chem. 75, pp. 4718-4723, 2003.
Unger, M.A., et al., "Monolithic Microfabricated Valves and Pumps by Multilayer Soft Lithography", *Science*, vol. 288, No. 5463, pp. 113-116 (Apr. 2000).
Thorsen, T. , et al., "Microfluidic Large-Sclae Integration", *Science*, vol. 298, No. 5593, pp. 580-584 (Sep. 2002).
Rolland, J.P. , et al., "Solvent-Resistant photocurable 'Liquid Teflon' for Microfluidic Device Fabrication", JACS, vol. 126, pp. 2322-2323 (2004).
Studer, V., et al., "Scaling Properties of a Low-Actuation Pressure Microfluidic Valve", *Journal of Applied Physics*, 95 (1), pp. 393-398 (2004).
Fredrickson, C.K. , et al., "Macro-to-Macro Interfaces for Microfluidic Devices", *Lab on a Chip*, 4, pp. 526-533 (2004).
Gu, W., "Computerized Microfluidic Cell Culture Using Elastomeric Channels and Braille Displays", PNAS, vol. 101, No. 45, pp. 15861-15866 (2004).

* cited by examiner

A.

PRIOR ART

B.

FIGURE 7A
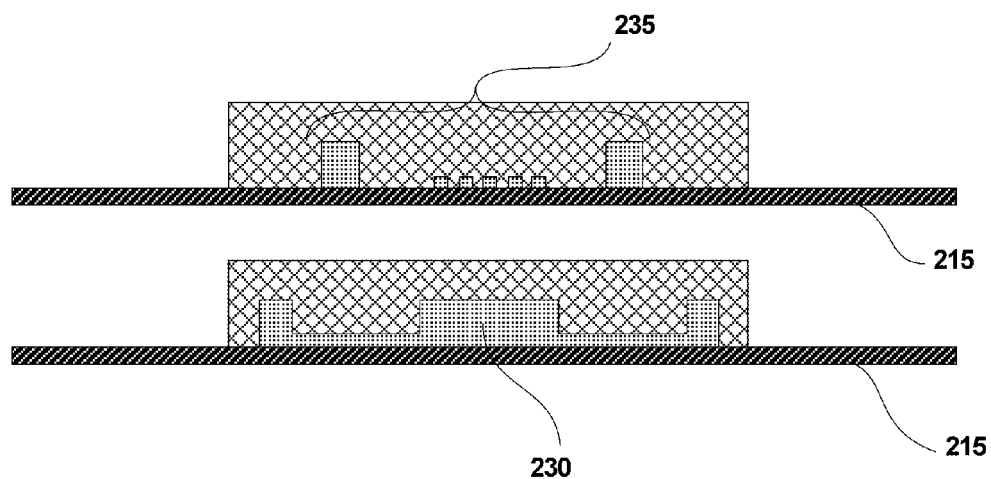
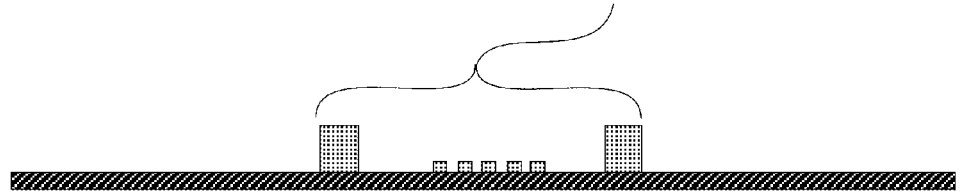
FIGURE 7B

280

MICROFLUIDIC METHOD AND STRUCTURE WITH AN ELASTOMERIC GAS-PERMEABLE GASKET

CROSS REFERENCE TO RELATED APPLICATIONS

This application claims priority to U.S. Provisional Ser. No. 60/765,150 for "Rigid Microfluidic Device with an Elastomeric Gas-Permeable Gasket" filed on Feb. 3, 2006; U.S. Provisional Ser. No. 60/791,778 for "Rigid Microfluidic Device with an Elastomeric Gas-Permeable Gasket" filed on Apr. 13, 2006, and is a continuation in part of U.S. application Ser. No. 11/514,396 for "Method and Apparatus for the Mechanical Actuation of Valves in Fluidic Devices" filed on Aug. 30, 2006, all of which are incorporated herein by reference in their entirety.

BACKGROUND

1. Field

The present disclosure relates to the fabrication and assembly of microfluidic devices. In particular, a method and apparatus are disclosed wherein the elastomeric layer is a gas-permeable gasket without features.

2. Description of Related Art

Recent developments in the mechanical actuation of microfluidic valves have demonstrated that closing valve membranes against hard surfaces may be more efficient than that against soft surfaces. Most parts of an elastomeric microfluidic device do not need the elastomeric properties (i.e. elasticity, gas permeability, transparency). Some parts may only need chemical inertness, while others may only require transparency. Thus, by decreasing the thickness of the elastomeric layer in a microfluidic device, valve closing by mechanical actuation onto the proximal hard layer is more efficient. Furthermore, it results in a microfluidic device that can withstand higher forces, higher pressures and does not leak. Although devices combining rigid and soft materials have been reported, (Lai, S. M et al. *Chem. Commun,* 2003, 218-219; Yamamoto, T. et al. *Lab Chip,* 2002, 2, 197-202) they have not been designed from the standpoint of material requirements and were used in much less demanding applications than radio synthesis At present, there are several materials that possess properties necessary for microfluidics, however, the curing profile of these materials is such that as soon as it is hard enough to manipulate, the material is already cured past the point at which polymerization of the layers to be bonded could take place. Current methods require several curing steps and not many materials can afford such repeated curing, leaving a limited number of possible materials to use. The most well known methods of microfluidic fabrication rely on molding individual layers and then assembling them together (Psaltis, D. et al. *Nature,* 2006, 442, 381-386). Microfabrication of elastomeric materials is further complicated by the necessity to handle partially-cured polymer during intermediate steps of the process.

There are several new materials under development that surpass well-known PDMS (polydimethylsiloxane) in their chemical resistance. Use of these materials in place of PDMS will undoubtedly broaden the utility of microfluidics within a range of applications. New materials, however, require the development of novel handling methods that allow precise microfabrication of features in under-cured polymers and layer-to-layer adhesion. These two parameters alone are non-trivial and preclude many new applications in microfluidics.

In view of the present art, what is needed is a microfluidic device that circumvents the complicated and precise microfabrication of features in under-cured polymers as well as the task of layer-to-layer adhesion to provide a microfluidic device that is can be fabricated reproducibly and has utility amongst a range of reaction chemicals, while having a tight seal and being durable.

SUMMARY

In a first aspect of the present invention, a fluidic structure is disclosed, said fluidic structure comprises a first layer (30); a second layer (40) contacting said first layer, said second layer being flat, flexible, gas permeable and featureless; a third layer (60) contacting said second layer; at least one fluid channel (50), said at least one fluid channel positioned in the first layer; at least one valve pin hole (20), said at least one valve pin hole passing through the third layer and stopping at the second layer; at least one pin (10), wherein the at least one pin is activatable to actuate the second layer to occlude the at least one fluid channel.

In a second aspect of the present invention, a fluidic structure is disclosed, said fluidic structure comprises a first layer (30); a second layer (40) contacting said first layer, said second layer being flat, flexible, gas permeable and featureless; a third layer (60) contacting said second layer; at least one fluid channel (50), said at least one fluid channel positioned in the first layer; at least one valve pin hole (20), said at least one valve pin hole passing through the third layer and stopping at the second layer; at least one pin (10), wherein the at least one pin is activatable to actuate the second layer to occlude the at least one fluid channel, and at least one mechanical means for assembling the first, second and third layers such that the first, second and third layers form a monolithic fluidic structure.

In a third aspect of the present invention, a method of fabricating a fluidic structure is disclosed, said method comprising the steps of forming a first layer (30); forming a second layer (40) contacting said first layer, said second layer being flat, flexible, gas permeable and featureless; forming a third layer (60) contacting said second layer; forming at least one fluid channel (50) positioned in said first layer; forming at least one valve pin hole (20); providing at least one pin (10); and providing a means of actuating the at least one pin in order to actuate the second layer to occlude the at least one fluid channel.

In a fourth aspect of the present invention, a method of fabricating a fluidic structure is disclosed, said method comprising the steps of forming a first layer (30); forming a second layer (40) contacting said first layer, said second layer being flat, flexible, gas permeable and featureless; forming a third layer (60) contacting said second layer; forming at least one fluid channel (50) positioned in said first layer; forming at least one valve pin hole (20); providing at least one pin (10); providing a means of actuating the at least one pin in order to actuate the second layer to occlude the at least one fluid channel, and providing at least one mechanical means for assembling the first, second and third layers such that the first, second and third layers form a monolithic fluidic structure.

One advantage of the present disclosure is that in addition to improved fluid control, the disclosed microfluidic device and methods thereof, obviates the problems associated with microfluidic devices of the prior art which include limited types of materials.

Most known methods of microfluidic fabrication rely on molding individual layers and then assembling them together. The method proposed here can reduce the number of curing steps to one. All the elastomer-related functions are confined within one layer that is without features. The features (e.g. fluid channel, vent channel, etc) are fabricated within the hard layers that can be made from a variety of materials including glass and silicon with minor modifications of the procedure. It is not imperative that the third (upper) hard layer is chemically resistant since it does not come in contact with the reagents. Thus, the present invention obviates the inhibiting material restriction imposed on valve-carrying microfluidics of the prior art.

BRIEF DESCRIPTION OF THE DRAWINGS

FIG. 3A shows a "thick" pin valve in prior designs. FIG. 3B shows the "thin" pin valve of the present disclosure.

FIG. 6A shows vent and flow layers cast on wax molds and cured to an elastomer-like state. FIG. 6B shows soft vent (235) and flow layers (230) removed from molds, followed by hole punching and pin insertion. FIG. 6C shows thin elastomeric gasket layer cast on a flat surface (215) and partially cured. FIG. 6D shows the flow layer placed on top of the gasket layer. FIG. 6E shows the molded layers after cutting the excess thin layer, two layers are pulled off the casting surface and inverted. FIG. 6F shows after the addition of the vent layer on top of the gasket layer, the assembly is cured to completion.

FIGS. 7A-F show the step-wise fabrication of a microfluidic device using sacrificial "inverse" molds.

DETAILED DESCRIPTION

A rigid microfluidic device with a thin elastomeric gasket layer allows for efficient mechanical actuation of fluid channels. In addition, a thin elastomeric gasket does not absolutely require adhesion between the layers. When a gasket is clamped between two hard layers with sufficient force, the chip acts as a monolithic device that does not allow leaks or unwanted channel connections at fluid pressures in excess of 40 psi and at elevated temperatures up to 100° C.

A new method is disclosed herein for fabrication of a microfluidic device that results in a sealed apparatus that is easily reproducible and durable. This microfluidic device can be mechanically held together rather than chemically adhered. A microfluidic device as described herein comprises a middle "gasket" layer positioned between at least two hard outer layers. This gasket layer is sufficiently deformable (e.g. flexible or elastic) to form a fluid-tight seal against the outer layers, acting essentially as an O-ring between the other two layers.

Figure 1:
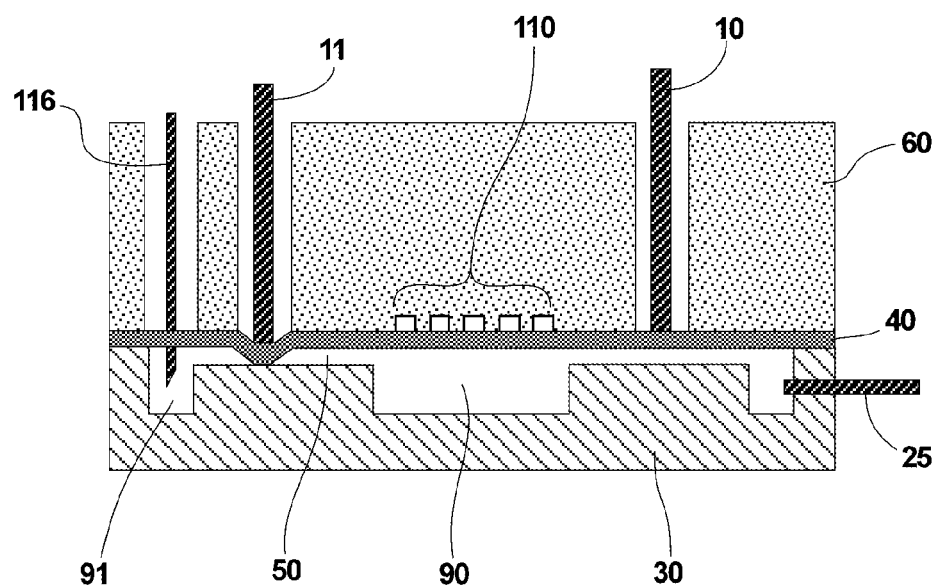
FIG. 1 shows a vertical cross-section of a gasket chip according to the present disclosure.

The method of the present disclosure, involves the technology suitable for fabrication of microfluidic devices based on a reactor with mechanically-actuated valves. In one embodiment, the microfluidic device (also referred to as a "chip") comprises at least three layers, as follows: (1) a first rigid layer (30) with the fluidic network etched or molded in it; (2) a flat second (middle) gasket layer (40) of gas-permeable elastomer without, bridging over the features of the first layer; and (3) a hard third layer (60) with vent features and sleeves for mechanical valve actuators (FIG. 1).

The layers of a device according to the present invention, can be bonded by well-known bonding methods, or held together by mechanical means as opposed to chemical means. A combination of both mechanical and chemical means for layer assembly is also possible. For mechanical assembly, for example, the layers can be bolted or clamped together. The outer two layers should be rigid enough to transfer the mechanical clamping force to the interface between the gasket layer and each of the outer layers, and to prevent collapse of intricate channel features molded in their surfaces. And, as discussed above, the gasket layer should be flat, deformable (e.g. flexible or elastic) to form a fluid-tight seal against the proximal layers, featureless and gas permeable in order to accommodate the solvent exchange requirement of the device.

Figure 2:
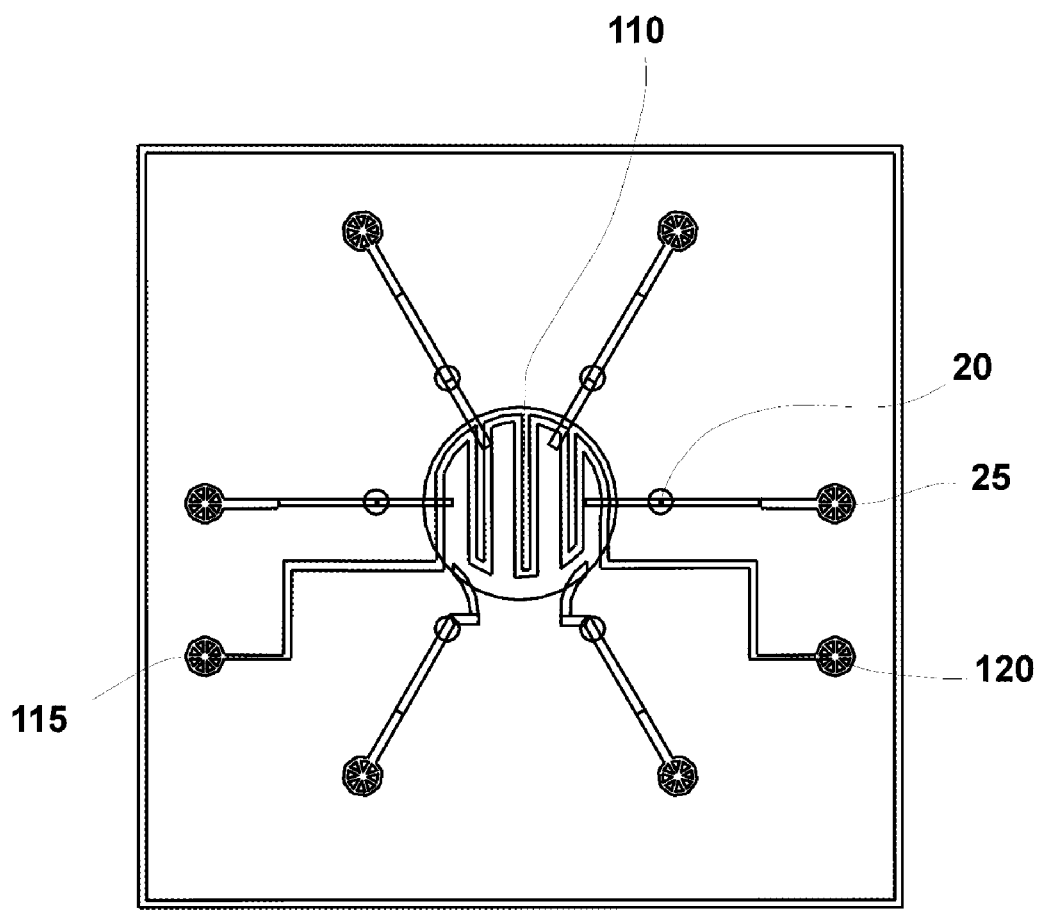
FIG. 2 shows a top-view schematic of fluidic structure having a 6-valve pin hole (20) arranged in a symmetrical radial pattern, with 6 corresponding fluid channels (50) further comprising a vent channel (110) having an input (115) and an output (120).

FIG. 2 contains the top view of a chip having 6 valve pin holes (20) with 6 corresponding fluid channels (50). Vent channel (110) allows for the evaporation of solvents across the second gasket layer membrane. FIG. 1 demonstrates the vertical cross-section of the same device taken through the middle. It illustrates that all the elastomer properties required for an operational chip can be concentrated in the single flat thin layer without any features and therefore not requiring elastomeric microfabrication. The lower (first) layer (30) and the upper (third) layer (60) are hard, rigid layers. The middle soft "gasket" is without features. Thus, all features (fluid channel, reaction area, vents, fluid reservoir etc) are within the rigid hard layers. This design allows for the gasket layer to be without features, and thereby does not limit the necessary thickness required of the gasket layer for function.

With a thin elastomer gasket layer, actuation of the pin-valves stretches the elastomer gasket layer against the hard curved surface of the fluid channel as the fluid channels goes from an open (10) state to closed (11). Fluid reservoirs (91) are also a feature of the assembled device, and are below the gasket layer (40). If the lower first layer is etched in glass or silicon, the fluids can be introduced via needles (116) that puncture the gasket. Alternatively, if the first lower layer is made of a hard polymer the fluid inlets can be formed by hollow metal pins introduced into the polymer during molding. The vent (110) in the third upper layer is separated from the reaction chamber (90) by the gas permeable membrane (gasket layer). As mentioned, given the elastomer layer has no features, this elastomer membrane can be made as thin as it can be without breaking. In other words, the gasket layer is not limited in thickness by other features contained in the layer.

Valves

Valves of the prior art, (FIG. 3A) had to compress 200-600 um of polymer in order to close a 45 um channel. This design resulted in excess stress leading to failure by tearing. Furthermore this design required higher pressures, yet the designs could not withstand the increased pressures. The reason for such thickness was that the same layer contained the reaction chamber and a vent membrane above it and could not be made any thinner. Also in these valves, the pin has to close a concave surface over a flat one by shrinking the former (a geometry requiring extra pressure and creating more stress).

Figure 3:
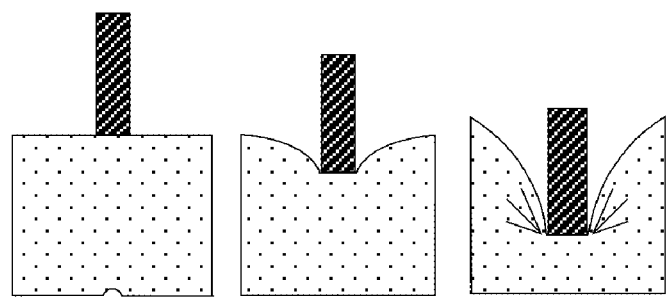
FIGS. 3A-B.
Figure 3:
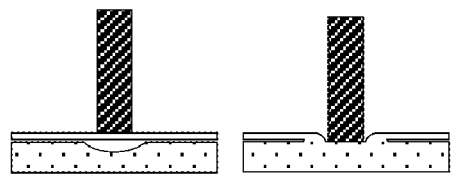

Valves of the present invention, stretch the elastomer layer over ~45 um, to close a 45 um channel, pressing it against the concave surface of the channel (less stressful geometry) (FIG. 3b). Lower actuation pressures, more efficient closure and lower elasticity requirements are provided by the gasket layer, valve design of the present invention. Thinner elastomer can be controlled more precisely. In the example of FIG. 3B, the pin tips are rounded to accommodate the "cup" valve design. This cup valve design as shown, refers to a rounded pin which upon actuation, actuates the gasket layer and together the gasket layer and the pin move across the width of the fluid channel forming a seal with the opposing first layer, thereby occluding the fluid channel. Alternatively, pneumatic actuation relying on a similar principle has been reported in all-elastomer devices exhibiting significantly lower closure efficiency (Grover, W. H. et al. *Sensors and Actuators B*, 2003, 89, 315-323).

Figure 4:
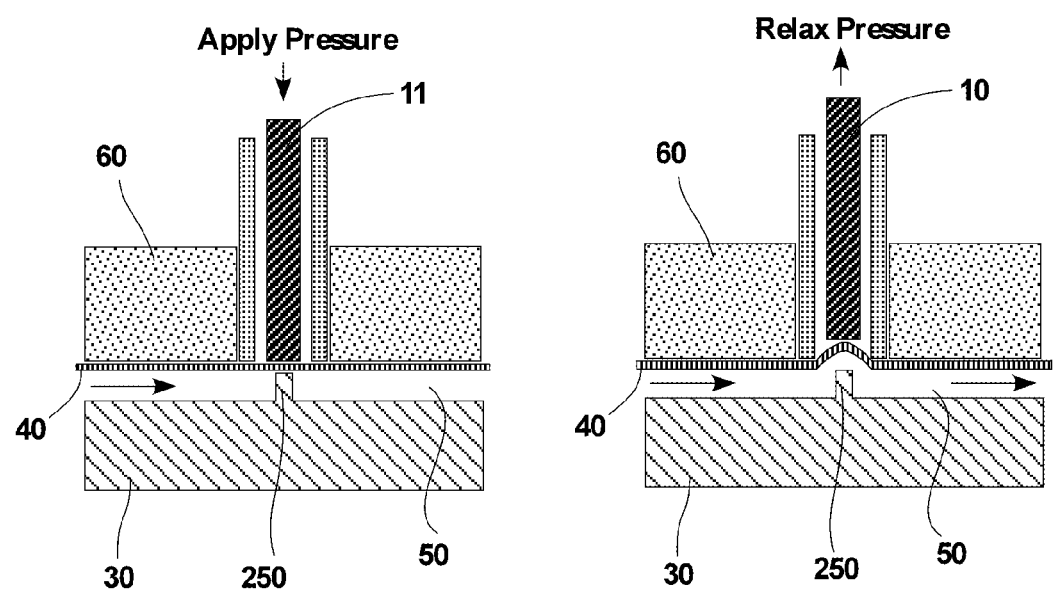
FIG. 4 shows a "gap" valve design wherein the fluid channel comprises a raised feature (250) opposite of the valve for meeting the pin upon actuation of the second (gasket) layer (40).

In an alternative embodiment, the fluid channel of the first layer comprises a raised feature or platform (250) which is positioned opposite the valve pin hole (20), wherein actuation of the pin (10,11) actuates the second gasket layer (40) to form a seal with the platform (250), thereby occluding the fluid channel (50). This type of valve closure is referred to as a "gap" valve (FIG. 4).

Pins and Valve Pin Holes

One of skill in the art can envision a variety of possible materials to be used as the pins. In one embodiment, the pins are metal wire (an example of such can be purchased from Gambit Corporation). One of skill in the art can envision that the smaller the pin, the more likely it is to act as a needle and tear or prick through an elastomer layer. Thus, when applying the present invention on a smaller scale, it may be preferred to use a hollow pin (e.g. a hollow metal wire), or any shape that is not sharp.

A fluidic structure of the present disclosure comprises at least one valve pin hole (20). In one embodiment, each valve pin hole corresponds to one fluid channel (50). That is, each actuated pin corresponds to a valve pin hole whereby the actuated pin in the valve pin hole occludes a corresponding fluid channel.

Pin Actuation

The pin can be actuated (moved) by applied pressure or by coupling the pin to a solenoid (Electromechanisms, San Dimas, Calif.). The pin can be actuated pneumatically. This can be carried out by connecting the pin to a commercially available pneumatic cylinder (Festo, Hauppauge, N.Y.). Applied pressure to actuate the pin as disclosed herein, can be applied between 0 and 45 pounds per square inch (psi).

Layer Materials

The first layer (30) of the present invention can be fabricated from a variety materials provided the material is relatively rigid, is compatible with the reaction reagents, is thermally conductive, (has a low heat capacity) if the reaction to be processed requires heating and/or cooling. Examples of possible materials for the first layer of the present invention, include, but are not limited to: DCPD (dicyclopentadiene), glass, metal (e.g. alumunim, copper), metal coated with a protecting layer, ceramic, polycarbonate, silicon, graphite, or DCPD doped with any of the above or other components known to one of skill in the art.

The gasket layer (40) of the present invention can be fabricated from several materials, provided the gasket material is deformable (i.e. flexible, elastic), gas permeable, is compatible with the reaction, has enough tensile strength to withstand actuation by mechanical pins. Examples of possible materials for the second gasket layer of the present invention, include, but are not limited to: PDMS (polydimethylsiloxane), PFPE (perfluoropolyether), ROMP (ring-opening metathesis polymerization) polymer, various combinations of DNB (decylnorbornene), HNB (hexylnorbornene), and FNB (fluoronorbornene), or those polymers alone, PTFE (polytetrafluoroethylene), PVDF (polyvinylidene difluoride), and latex.

The gasket layer—if sufficiently thick—can "absorb" a slight amount of non-uniformity in the hard layers. Other rigid-chip microfluidic technologies (involving only glass or silicon) require extremely flat surfaces at the bonding interface to get a good seal by methods such as anodic bonding. The gasket layer relaxes this requirement and allows the use of manufacturing processes such as machining and molding that may not result in ultraflat surfaces. The gasket thickness can be designed to make it impossible that the channels in each hard layer be occluded, even if substantial mechanical pressure is applied to the chip.

The third layer (60) of the present invention can be fabricated from a variety of materials, provided the layer material is relatively rigid (can withstand force up to 80 psi), and is preferably transparent, though transparency is not absolutely necessary. This third layer does not have to be compatible with the reaction given all species reaching this layer are removed by applied vacuum through the vent (110). Examples of possible materials for the second gasket layer of the present invention, include, but are not limited to: DCPD, glass, polycarbonate, and quartz.

Actuation of Valves

The valves of the microfluidic device of the present invention require a means of actuation. For most efficient fluid control and leak-free operation, the valves are actuated by mechanical means. That is, an object transfers force onto the second gasket layer, which is then actuated to occlude the fluid channel. An example of such an object is a pin. The pin can be a hollow metal pin (117) placed into a valve pin hole (20). The valve pin hole serves to guide the pin to avoid misdirection.

Assembly of Layers

The layers (30, 40, 60) of the microfluidic device can be assembled together via chemical adhesion or mechanical means.

Figure 5A:
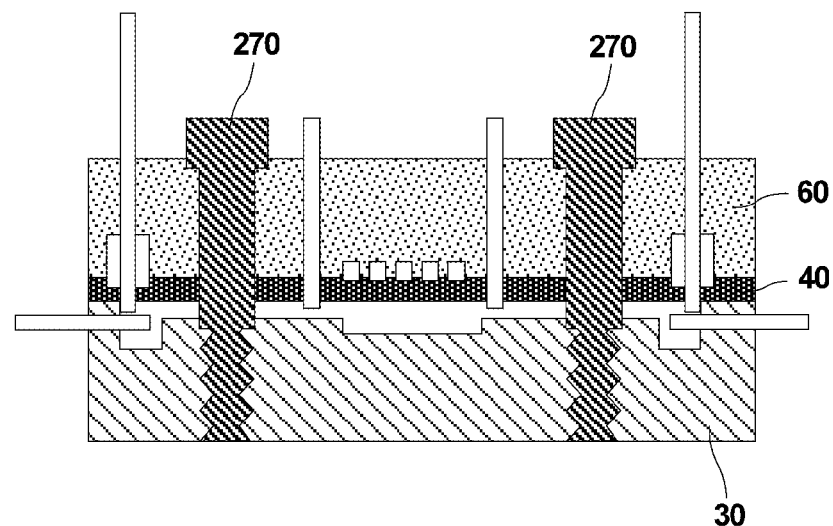
FIG. 5A shows a cross section of a gasket chip assembled by mechanical means—using, for example, screws (270).
Figure 5B:
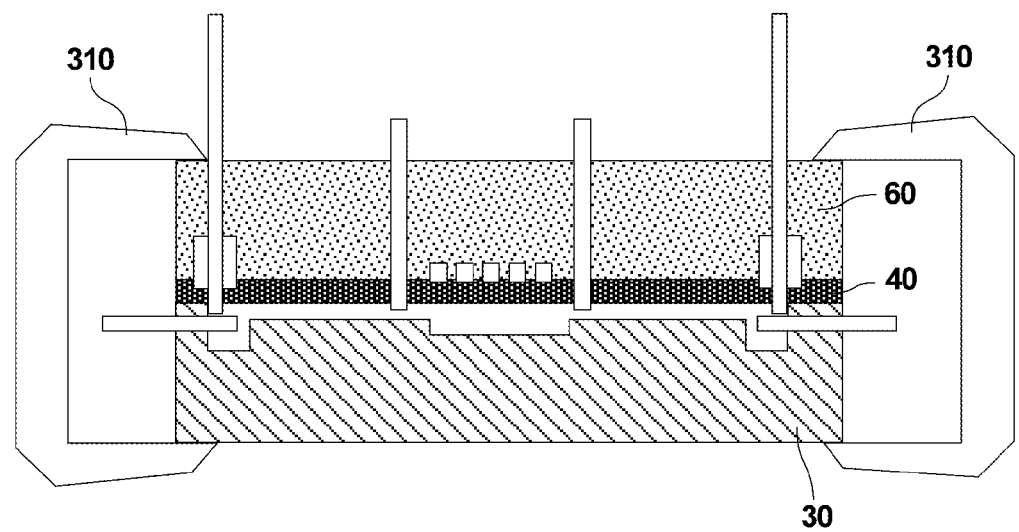
FIG. 5B shows a cross section of a gasket chip assembled by mechanical means—using, for example, clamps (310).

Mechanical Assembly (Non-adhesion). Mechanical means (such as screws or clamps) avoid the inconsistency of multiple curing steps. Additionally, mechanical means allow for the apparatus to be disassembled and possibly reused. FIG. 5A shows a cross section of a gasket chip assembled using screws, wherein two screws (270) are provided into two screw holes (280), wherein the two screw holes transverse the three layers thereby forming a monolithic microfluidic device. Alternatively, as shown in FIG. 5B, at least one clamp (310) is used for mechanically assembly of the microfluidic structure.

Using mechanical assembly means, new microfluidic chip materials can be evaluated quickly. Mechanical assembly eliminates the considerable amount of time that is commonly required to develop fabrication protocols for the bonding (chemical adhesion) of new materials. Additionally, materials that are preferred for any desired reaction, can be utilized and used in conjunction with other layer materials to which they would not bond well. For example, commercial, ready-made materials know to be inert, such as Teflon, glass, Chemraz, PEEK, Simriz, Larez and others can be used despite their inability to be modified for chemical bonding.

Adhesion-less assembly also allows for the possibility of more than three layers. For example, one can envision a 5-layer chip with the following layers (from top to bottom): (i) thick, rigid valve-guiding layer; (ii) thin flexible gasket layer to act as valve membranes; (iii) thin, rigid layer containing flow channels; (iv) thin flexible gasket layer to act as gas exchange membrane; (v) thick, rigid layer containing vacuum vent channels. This architecture has the advantage of separating the requirements of the gasket material: the top gasket must be tough and flexible but need not be gas permeable while the bottom gasket must be permeable but need not be flexible or tough. This further expands the range of suitable materials for device fabrication.

With mechanical assembly, processing methods are not limited by the need for assembly during partially cured states. For example, under-cured soft-gelled gasket layers must be supported by a substrate during handling to prevent wrinkling and damage. Typically, in other fabrication approaches, a thicker layer is first stacked on the gelled layer and bonded to it. Adhesion-less chips allow the use of fully-cured gasket layers which have sufficient strength/toughness to be handled on their own (e.g. with tweezers) and lack much of the stickiness/tackiness often associated with undercured materials that makes them difficult to handle.

In one embodiment, the mechanical assembly is self-aligning. When the rigid first and third layers are fabricated on a CNC (computer numerical control) device, the screw holes are placed in these layers in precise locations allowing the chip to fit together only one possible way. It should be noted that non-mechanical methods require manual alignment of layers commonly results in the mis-alignment of features, which in turn reduces the performance of the chip and often leads to failure.

FIGS. 5A-B

The approach has been recently validated using a rigid DCPD (dicyclopentadiene) vent (third) layer, a rigid DCPD flow (first) layer, and a fully-cured elastic FNB/DNB (fluoronorbornene/decylnorbornene) gasket layer. FIG. 5A shows matching sets of 6 holes were drilled into each of the DCPD layers—through-holes in the vent layer and threaded holes (280) in the flow layer. Holes were punched through the gasket layer at the 6 positions corresponding to where the screws (270) would pass through. The three layers of the device were assembled and held together by screws tightened with moderate torque (by hand). The seal was sufficient to hold at least 45 psi of fluid pressure, tested by injecting acetonitrile into the flow channels. Valves in the chip functioned correctly and operated under similar conditions as needed to actuate valves in chips fabricated by adhesion methods.

The chip was exposed to high temperatures (100° C.) for long periods of time (2 hours) with trapped acetonitrile (liquid and vapor) and no leaks were observed, despite a slight softening of the DCPD.

Connections were made to the chip by inserting stainless steel tubing into holes drilled into the DCPD after full curing to a rigid state. Depending on the exact size/quality of the hole and the exact tubing diameter, a friction fit was sufficient, in several cases, to form a liquid-tight seal up to at least 45 psi. To ensure a superior seal, some FNB/DNB precursor was deposited around each piece of tubing protruding from the chip and cured in place. Other "glue" materials may be suitable. One could also imagine special fittings that screw into mating holes machined into the chip or the use of a variety of other specialized fittings. It is also conceivable to punch holes and insert the tubing while the DCPD or hard layers are in a "gelled" state and cure the DCPD to completion afterward.

In one embodiment, the microfluidic structure comprising at least three layers as described herein, is assembled using screws (270) (FIG. 5A). In an alternative embodiment, the microfluidic structure comprising at least three layers as described herein, is assembled using at least one clamp (310) (FIG. 5B).

Assembly by Adhesion. The thick layers (the first and third layer, for example) can be fabricated via molding as described below and shown in FIGS. 6-8, or by other techniques such as hot-embossing, injection-molding, conventional machining, etc. The gasket layers can similarly be fabricated by a variety of techniques such as spin coating, casting, injection molding, etc. Bonding methods are known in the art (see, for example, U.S. Pat. No. 7,040,338; U.S. application Ser. No. 11/297, 651).

Molding of Layers

FIGS. 6A-6F shows the stepwise method of forming features such as fluid channels and reaction area into the first layer and forming vent channels in the first layer and providing pin valve holes through all three layers with the gasket layer in between the first and third hard layers.

Some hard materials have an intermediate state in their curing profile which resembles an elastomer in its properties. In one embodiment, the hard layers are cast on the corresponding molds and cured to an intermediate (elastomer-like) state without pins and sleeves. The gasket layer is cast or spin-coated on a flat surface (215) such as that of a Si wafer. The hard layers are removed from molds (if the latter are wax molds, the wax can be washed out at this point), and have holes for fluid inlets and outlet (I/O) ports (25) and pin holes (20) punched in them. Then they are assembled with metal pins for fluid delivery and actuator pins. Afterwards they are joined by their bottom surfaces placing the gasket between them and cured to their final state resulting in a 3-layer device. This method (FIGS. 6A-F) assures easy pin insertion and adhesion of layers, which has been demonstrated sufficient to hold the chip together throughout the synthesis.

Figure 6A:
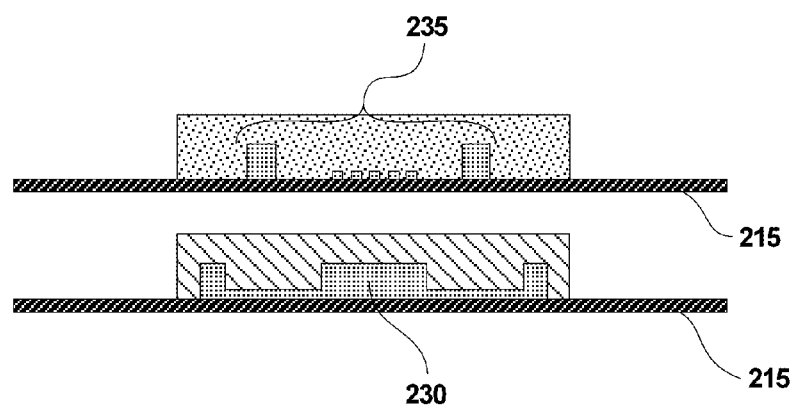
FIGS. 6A-F.
Figure 6B:
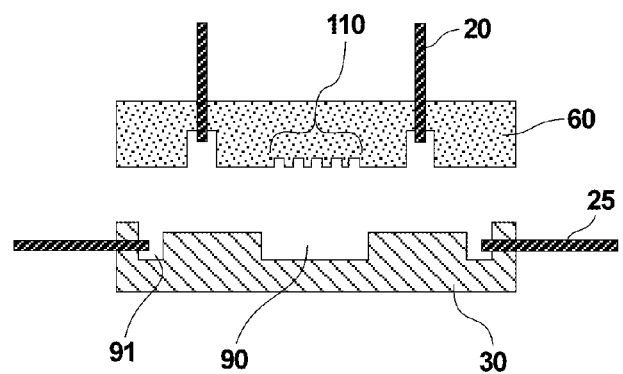
Figure 6C:
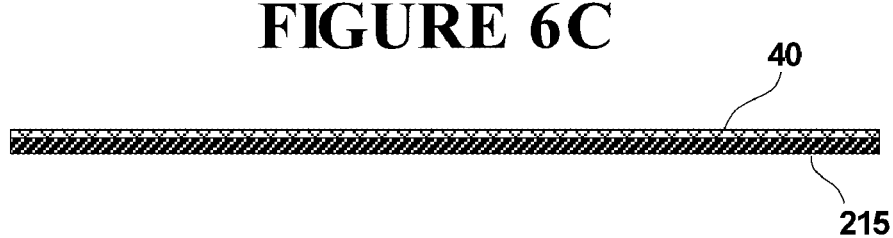
Figure 6D:
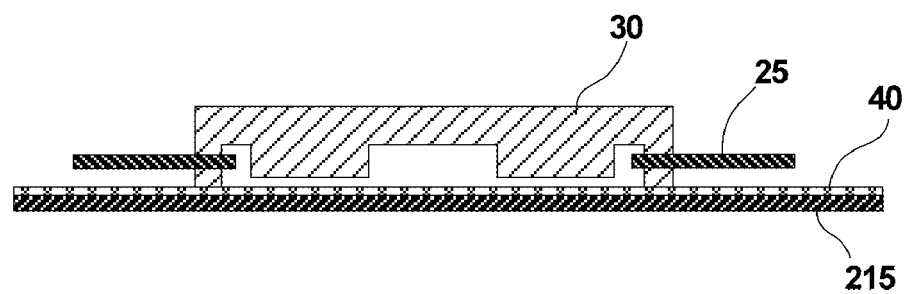
Figure 6E:
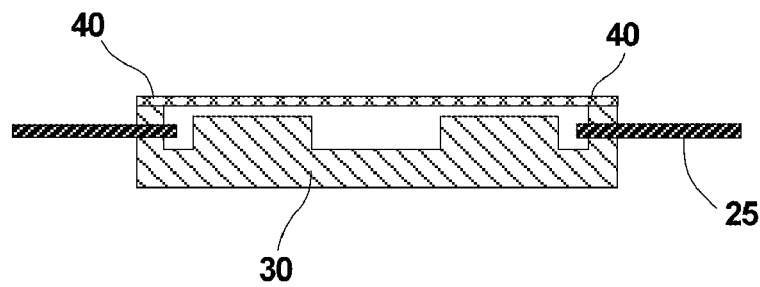
Figure 6F:
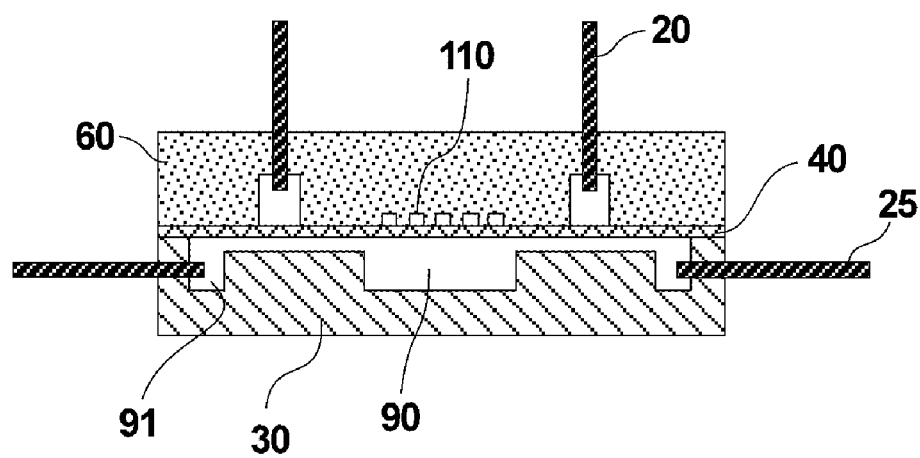

The steps for this fabrication are as follows: vent (235) and flow (230) layers cast on wax molds are cured to an elastomer-like state (FIG. 6A). Soft vent and flow layers are removed from molds, followed by hole-punching and pin insertion (FIG. 6B). Thin elastomeric gasket layer is then cast on a flat surface and cured partially just past a gel state (FIG. 6C). The first lower flow layer (30) is then dropped on top of the gasket layer (40). Minimal tackiness at this step needs to be stronger between the flow layer and the gasket layer than between the gasket layer and the bottom flat surface (215) (FIG. 6D). After cutting off the excess thin layer, two layers are pulled off the casting surface (215) and inverted (FIG. 6E). After addition of the vent layer on top of the first two, the assembly is cured to completion resulting in a well-adhered device comprising two hard layers (30, 60) and one soft layer (40) in between (FIG. 6F).

FIGS. 7A-7F

FIGS. 7A, 7B. Sacrificial wax molds for both fluid (230) and vent (235) layers. In one embodiment, these molds are printed on Si wafers (215) by a 3-D printer. In another embodiment these wax molds can be made from an elastomeric "inverse mold" on a Si-wafer or another substrate that the wax can weakly adhere to. The bond has to be strong enough to hold the wax in place, but yet weak enough to allow the wax to be released into the molded part when the substrate is removed. Such conditions can be optimized by one of skill in the art.

Figure 7C:
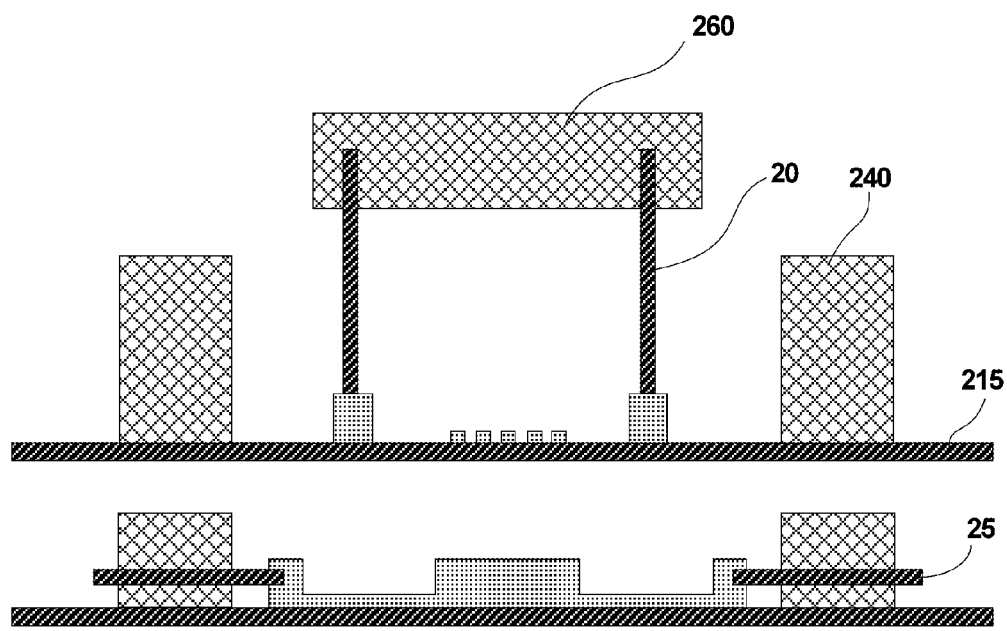

FIG. 7C. The next step after preparation of the inverse mold, is to create borders (240) around the molds that would (a) hold the pre-polymer in a confined space and (b) hold the I/O ports (25) in the case of fluid layer. These borders can once again be made of an elastomer that seals well to the substrate and does not absorb the hard pre-polymer or react with it. The height of these borders determines the thickness of the layers made in the next step. The top layer needs pin sleeves (for the valves) (20) to be attached to the mold so that they are locked in place when the hard polymer cures. These are attached to the wax expansions and stand vertically, and are held in place by a rigid "guide" (260) from above. The same connection is made for the vent I/O ports. The first lower (fluid) layer connections are made through the sides of the mold with pins held by the elastomer border and connected to the wax expansions at the ends of the fluid channel features.

Figure 7D:
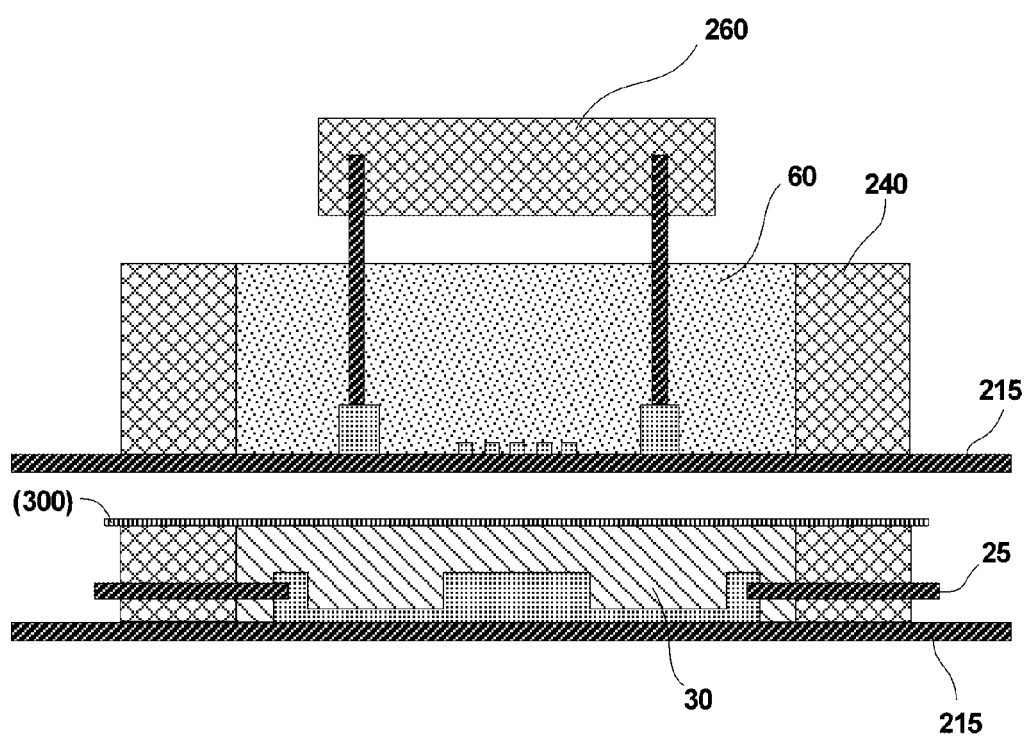

FIG. 7D. Next the assemblies of FIG. 7C are filled with hard pre-polymer, which is allowed to cure in them (FIG. 7D). In the case of the fluid layer, the pre-polymer is covered with a glass cover slip (300) to preserve the flat nature of the surface which will have to be in contact with the heating element in the final device.

Figure 7E:
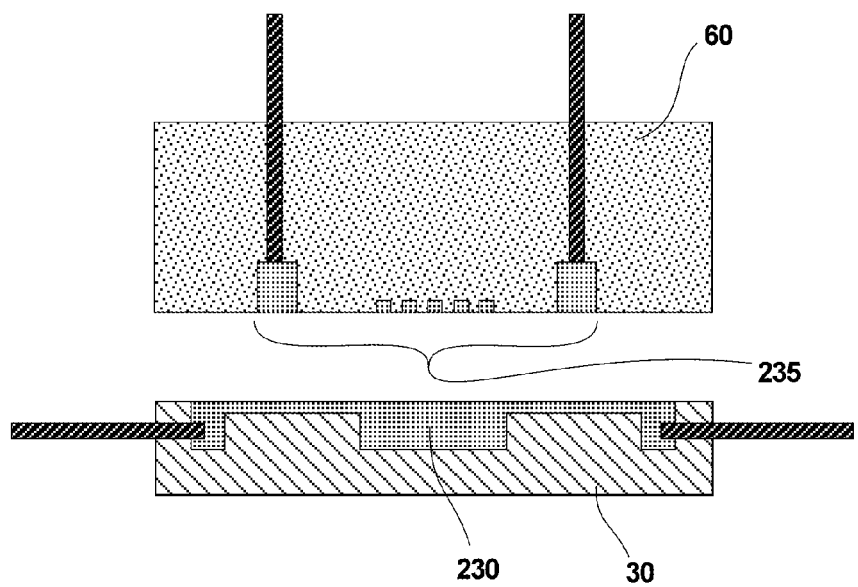

FIG. 7E. The hard polymer is cured to the earliest gel stage that allows unsupported structures to hold their shape and preserve the features. Then the borders (240), glass cover slip (300), and the substrates (215) are removed leaving the polymer with wax and pins (FIG. 7E). Hard layers removed from the molds. The first (fluid) layer is depicted turned over.

Figure 7F:
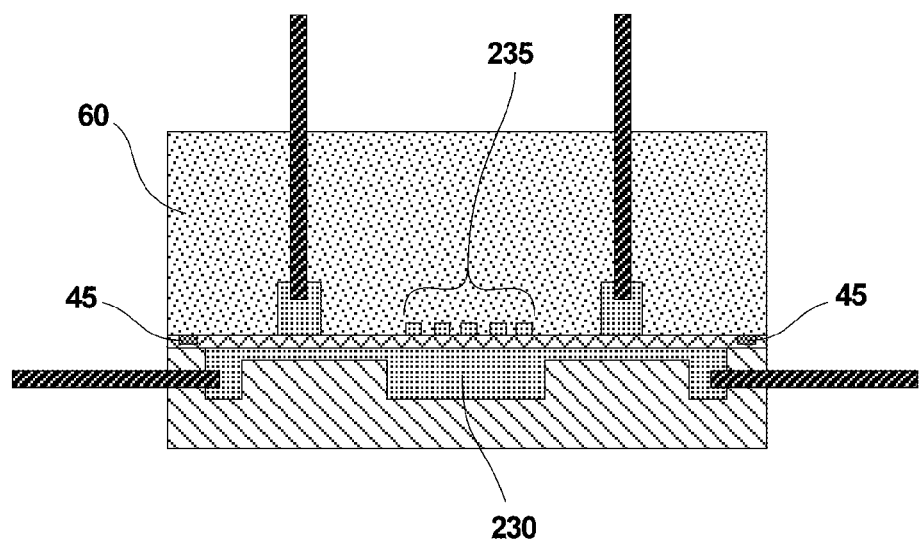

FIG. 7F. Spacer features (45) are placed on the fluid layer (after turning it over) to control the thickness of the elastomer layer (40). The elastomer pre-polymer is poured on top of the fluid layer with spacer features, which is immediately covered with the top (vent) layer (60) that rests on the supports. The entire assembly is then cured to completion (FIG. 7F).

The final step involves the removal of sacrificial wax by melting and rinsing the chip with organic solvents. Once the wax is removed, it yields a chip with all the architecture necessary for multi-step synthesis (FIG. 1). It is made of materials that are inert to chemical reactions. The valves have thin membranes that can deflect with minimum pin pressure and the reactor is separated from the vacuum vent by a thin gas permeable membrane allowing efficient evaporations and solvent exchange.

FIGS. 8A-8D

In an alternative embodiment, if the printing of the 3-D wax in the procedures of corresponding to FIGS. 6 and 7 does not yield desired smoothness of features, the following "tub" mold method can be used.

Figure 8A:
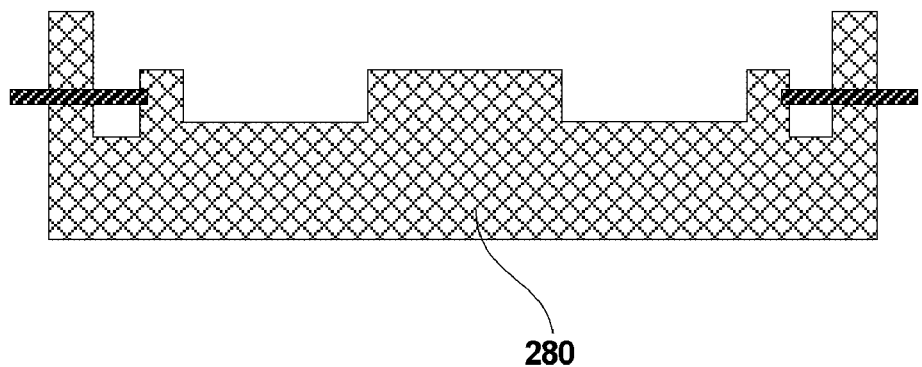
FIGS. 8A-D show the step-wise fabrication of a microfluidic device using elastomeric "tub" molds.

FIG. 8A. Elastomer "tub" mold. Prepare elastomer molds (280) (FIG. 8A) from photoresist molds for both fluid and vent layers. The elastomer should form a tub that will be filled by the hard layer precursor. The height of the walls of this tub determines the resulting layer thickness. The fluid I/O ports (25) (hollow metal pins) are inserted through the sides of the "tub" mold and connect to the reservoirs at the ends of fluid channels. The reasons for making this mold from an elastomer are (a) the ease of removal of a hard part with dense features from a soft mold and (b) the I/O port connections will have to break the mold as the part is removed.

Figure 8B:
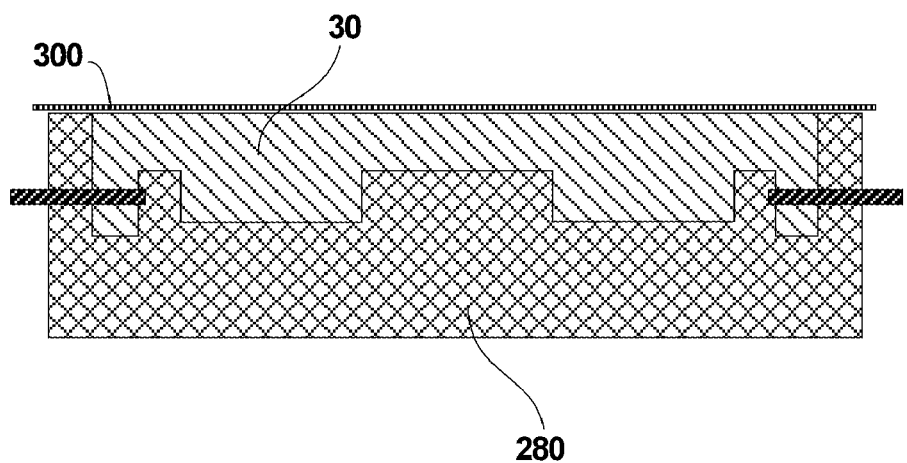

FIG. 8B. Hard Layer Casting. Deposit catalyzed pre-polymer into the "tub" and cover with a glass cover slip to form a flat surface will be in contact with a heating element in the final device (FIG. 8B).

Figure 8C:
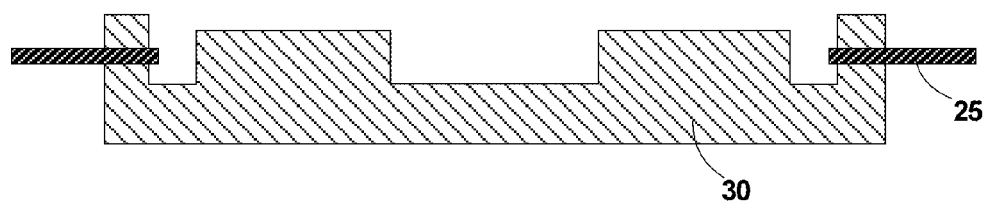

FIG. 8C. Gelled Hard Layer. Cure the hard polymer to a "gel" state (just rigid enough to be removed from the mold, but only partially cured). Remove the cover slip and the mold and inverted the part (FIG. 8C).

Figure 8D:
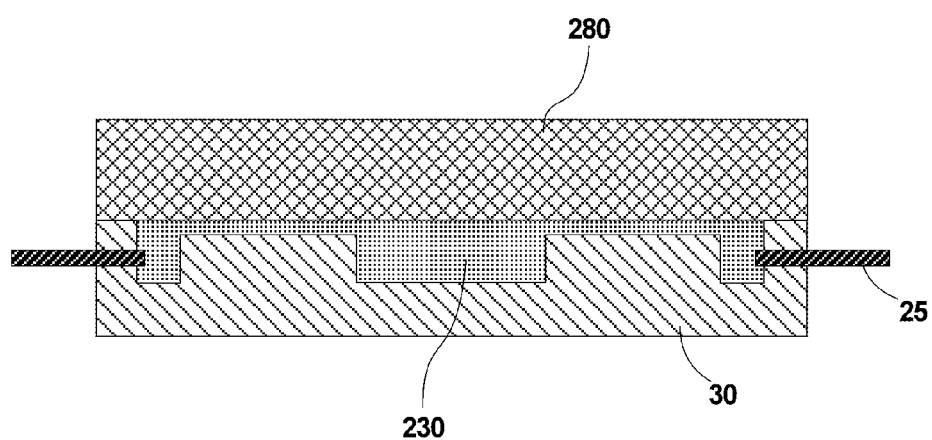

FIG. 8D. Injection of wax into the gelled mold with an elastomer seal. Fill the fluidic network with the sacrificial wax by either adding melted wax onto the surface and removing excess with a razor blade-like tool, or by covering the mold with a flat piece of elastomer sealing (290) at contact surfaces and filling the hot wax through the I/O ports (FIG. 8D). Upon cooling, the wax solidifies producing the fabrication intermediates shown in the previous mold methods of FIGS. 6 and 7.

The Fluidic Structure

The present disclosure comprises a first layer; a second layer contacting said first layer, said second layer being a flexible layer; a third layer contacting said second layer; at least one fluid channel, said at least one fluid channel positioned proximal to the second layer; at least one valve pin hole, said at least one valve pin hole passing through the third layer and stopping at the second layer; at least one pin, wherein the at least one pin is activatable to actuate the second layer, thereby occluding the at least one fluid channel; wherein the above together forms an integrated fluidic device.

The fluidic structure of the present invention can have many orientations. In a vertical orientation, the first layer can a lower layer, in which case, the second layer is a middle layer overlying the first layer, and the third layer is an upper layer, overlying the second middle layer. Alternatively, the first layer is an upper layer, wherein the second layer is a middle layer underlying the first layer, and the third layer is a lower layer, underlying the second middle layer.

In a horizontal orientation, the first layer is a right layer positioned to the right of the second layer which is positioned to the right of the third layer, which is the left most layer. Alternatively, the first layer is a left layer positioned to the left of the second middle layer, wherein the middle layer is positioned to the left of the third layer, wherein the third layer is the layer on the right of the middle layer.

Scale of Fluidic Structure

The size and scale of the fluidic structure of the present disclosure and the corresponding channel and pin sizes can vary as needed for a given application. It is apparent to one of skill in the art that there are advantages and disadvantages at both the micron (small) size and millimeter (larger) size. Thus, one of skill in the art can optimize the scale of the fluidic structure that will work best for a given application. The fluidic structure of the present disclosure can comprise channels which range in size from 10 µm to 1 mm in diameter having pins ranging in size from 0.25 inches to 12 inches or more in length and 100 µm to 1 millimeter in diameter. One can also contemplate a pin having a diameter of 1 centimeter, and of course a pin diameter between 1 millimeter and 1 centimeter.

Temperature Control

The fluidic structure of the present disclosure can be combined with a temperature control device such as a heat sink (e.g. Peltier device) and a fan. A fluidic structures can have an attached heat sink positioned below the synthesis chip (215). An array of temperature control devices can be coupled with the present disclosure as needed for a particular fluidic reaction. One of skill in the art can provide a temperature control device to the fluidic structure of the present disclosure.

In an alternative embodiment a fluidic structure, and more specifically, a synthesis chip of the present disclosure comprising a reactor area also comprises at least one vent channel. Such a vent channel (110) (FIG. 5) can be one of a variety of formations, as long as it facilitates the evaporation of solvent from the reactor area and enables reduction of reactor area pressure. The vent channel in FIG. 5 forms a serpentine pattern proximal to the reactor area. This vent channel has an input (115) and output (120), one of which is plugged and the other connected to a vacuum. Another possible vent channel pattern is a right-angled U-shape directly above the reactor area in the second flexible layer allowing for evaporation through this layer above the reactor area. A vent channel is preferably in contact with the third layer and positioned proximal to the reactor area.

Applications

Advantageous applications of the present mechanically activated fluidic structure are numerous. Accordingly, the present invention is not limited to any particular application or use thereof. In preferred aspects, the following uses and applications for the present invention are contemplated.

In a general application, the fluidic structure is used to control fluid flow in an integrated fluidic device. The fluid flow in the fluid channel can be any reactant fluid. The resulting process could be the synthesis of a compound. The resulting fluidic compound could be the result of a solvent exchange, wherein a first fluid reactant is fed through a fluid channel, and a solute is trapped (this application would further comprise a selective membrane in a fluid output channel for trapping the solute) and a subsequent second fluid reactant is fed through the same fluid channel, whereby the solute is suspended in the second fluid reactant. In this way, the fluidic structure of the present disclosure would provide a new method for solvent exchange.

Solvent exchange capability, granted by the gas permeability of the membrane (gasket) coupled with the seal strength of the valves allows the device based on the abovementioned architecture to be used in successful multi-step synthesis of radiopharmaceuticals such as PET probes that could not be easily synthesized in prior devices relying on similar synthesis principles because they could be realized with limited material choices (Lee, C.-C. et al. *Science*, 2005, 310, 1793-1797). Other microfluidic devices have been used for radiosynthesis, but these devices do not need to accommodate high temperatures and pressure and thus do not valves (Gillies, J. M. et al. *J. Appl. Rad. Isot.* 2006, 64, 325-332). Although similar valves have been described (Yuen, P. K et al. *J. Micromech. Microeng.* 2000, 10, 401-409), they would not be applicable in such devices without the versatility of material.

One could also imagine the above processes (synthesis, solvent-exchange, purification, etc.) being combined into an integrated fluidic process.

The fluidic structure as disclosed can be used in applications including, but not limited to: biopolymer synthesis, cell sorting, DNA sorting, chemical synthesis, therapeutic synthesis, optofluidics, and semiconductor processing.

In summary, a microfluidic structure and method are disclosed, where the structure comprises a featureless gasket layer allowing for efficient and reproducible structure production and assembly. Layering methods allow for the use of a variety of device materials and easy assembly.

While illustrative embodiments have been shown and described in the above description, numerous variations and alternative embodiments will occur to those skilled in the art. Such variations and alternative embodiments are contemplated, and can be made without departing from the scope of the invention as defined in the appended claims.

The invention claimed is:

1. A fluidic structure comprising:
   a first layer;
   a second layer contacting said first layer, said second layer being flat, flexible, gas permeable and featureless;
   a third layer contacting said second layer;
   at least one fluid channel, said at least one fluid channel positioned in the first layer;
   at least one valve pin hole, said at least one valve pin hole passing through the third layer and stopping at the second layer; and
   at least one pin, wherein the at least one pin is activatable to actuate the second layer to occlude the at least one fluid channel,
   wherein said third layer comprises at least one vent channel, said at least one vent channel connected to at least one vent input and one vent output and in communication with a reactor to vent reactor gas,
   wherein said at least one vent channel is adapted to allow for evaporation of solvents across said second layer and enable reduction of pressure.

2. The fluidic structure of claim 1, further comprising at least one mechanical means for assembling the first, second and third layers such that the first, second and third layers form a monolithic fluidic structure.

3. The fluidic structure of claim 2, wherein the at least one mechanical means of assembling the first, second and third layers comprises a screw hole and a screw, wherein said screw hole passes through the first, second and third layers, and further comprises insertion and actuation of said screw into said screw hole thereby forming a monolithic fluidic structure.

4. The fluidic structure of claim 2, wherein the at least one mechanical means of assembling the first, second and third layers comprises a clamp, wherein said clamp exerts force onto the first, second and third layers, thereby forming a monolithic fluidic structure.

5. The fluidic structure of claim 1, wherein said first layer comprises a reactor for reaction fluid deposit.

6. The fluidic structure of claim 1, wherein said first layer further comprises an input port.

7. The fluidic structure of claim 1, wherein the at least one pin is a hollow metal wire.

8. The fluidic structure of claim 1, further comprising a raised feature in the fluid channel of the first layer, wherein the raised feature is in the direction of the valve pin hole, such that actuation of the second layer places the second layer in contact with the raised feature, thereby forming a seal and occluding the fluid channel.

9. The fluidic structure of claim 8, wherein said raised feature is not rectangular.

10. The fluidic structure of claim 1, wherein the second layer is of uniform thickness.

11. The fluidic structure of claim 1, wherein the first layer is made of at least one selected from the group of dicyclopentadiene, glass, metal, metal coated with a protecting layer, ceramic, polycarbonate, silicon, and graphite.

12. The fluidic structure of claim 1, wherein the second layer is made of at least one selected from the group of polydimethylsiloxane (PDMS), perfluoropolyether (PFPE), ring-opening metathesis polymerization (ROMP) polymer, decylnorbomene (DNB), fluoronorbomene (FNB), hexylnorbomene (HNB), polytetrafluoroethylene (PTFE), polyvinylidene difluoride (PVDF), latex, and combinations thereof.

13. The fluidic structure of claim 1, wherein the third layer is made of one selected from the group of dicyclopentadien, glass, polycarbonate, and quartz.

14. A method of fabricating a fluidic structure comprising:
forming a first layer;
forming a second layer contacting said first layer, said second layer being flat, flexible, gas permeable and featureless;
forming a third layer contacting said second layer;
forming at least one fluid channel positioned in said first layer;
forming at least one valve pin hole;
providing at least one pin;
providing a means of actuating the at least one pin in order to actuate the second layer to occlude the at least one fluid channel;
providing at least one mechanical means of assembling the first, second and third layers thereby forming a monolithic fluidic structure; and
forming at least one vent channel positioned in the third layer, the at least one vent channel being in communication with a reactor to vent reactor gas,
wherein said at least one vent channel is formed to allow for evaporation of solvents across said second layer and enable reduction of pressure.

15. The method of fabricating a fluidic structure of claim 14, further comprising the step of curing the first and third layers prior to providing at least one mechanical means of assembling the first, second and third layers.

16. The method of fabricating a fluidic structure of claim 14, comprising the use of sacrificial molds.

17. The method of fabricating a fluidic structure of claim 16, wherein the sacrificial molds are wax or elastomer.

18. The method of fabricating a fluidic structure of claim 16, wherein the sacrificial molds form the features of the first and third layers.

19. The method of fabricating a fluidic structure of claim 18, wherein the features of the first layer comprise at least one fluidic channel and at least one reactor recess and the features of the third layer comprise at least one vent channel and one pin hole.

20. A method of using the fluidic structure of claim 1, for synthesizing a compound.

21. A method of using the fluidic structure of claim 1, for controlling fluid flow in an integrated fluidic device.

22. A device assembled by the method of claim 14, wherein the first and third layers are fabricated by computer numerical control (CNC).

23. A device assembled by the method of claim 22, wherein the first, second and third layers of the device are self-aligning.

24. A method of using the fluidic structure of claim 1, to perform evaporations of solvent across the second layer.

25. The fluidic structure of claim 1, wherein said fluidic structure is a microfluidic structure.

26. The fluidic structure of claim 25, wherein the at least one fluid channel is about 10 microns to about 1 mm in diameter.

27. The fluidic structure of claim 1, wherein at least most of the length of the channel is defined by the second layer.

28. The fluidic structure of claim 1, wherein the fluidic structure is monolithic such that the layers are bonded together by non-mechanical means and not easily separable.

29. The fluidic structure of claim 1, wherein the fluidic structure comprises at least one channel on each side of the second layer wherein such channels are configured to carry samples.

30. The fluidic structure of claim 1, wherein the gas-permeable second layer and the vents are together configured to perform functions of:
i) sealing the fluidic structure;
ii) being part of a valve allowing or blocking flow; and
iii) serving as a barrier between liquid and gas during filling and evaporation.

31. The fluidic structure of claim 1, wherein the fluidic structure is a five-layer chip.

32. The fluidic structure of claim 1, wherein a sample is provided by at least one needle that penetrates the second layer.

* * * * *